United States Patent [19]

Woodham

[11] Patent Number: 5,369,443
[45] Date of Patent: Nov. 29, 1994

[54] DIGITAL VIDEO EFFECTS GENERATOR

[75] Inventor: David J. Woodham, Lower Earley Reading, Great Britain

[73] Assignee: Abekas Video Systems, Inc., Redwood City, Calif.

[21] Appl. No.: 685,826

[22] Filed: Apr. 12, 1991

[51] Int. Cl.[5] .................. H04N 5/262; H04N 7/12
[52] U.S. Cl. ........................ 348/578; 348/590; 348/586; 348/441
[58] Field of Search .............. 358/183, 182, 181, 22, 358/160, 138, 21 R, 105; 382/41–49; 348/578, 590, 591, 592, 593, 586, 587, 441, 448, 453, 575; H04N 9/74, 7/12, 5/202, 5/272

[56] References Cited

U.S. PATENT DOCUMENTS

| | | | |
|---|---|---|---|
| 4,463,372 | 7/1984 | Bennett et al. | 358/22 |
| 4,667,233 | 5/1987 | Furukawa | 358/105 |
| 4,694,344 | 9/1987 | Flora | 358/183 |
| 4,751,660 | 6/1988 | Hedley | 364/518 |
| 4,774,507 | 9/1988 | Kashigi et al. | 340/723 |
| 4,831,441 | 5/1989 | Ando | 358/140 |
| 4,875,097 | 10/1989 | Jackson | 358/183 |
| 4,965,844 | 10/1990 | Oka et al. | 382/44 |
| 5,023,717 | 6/1991 | Lamnabhi et al. | 358/105 |
| 5,077,608 | 12/1991 | Dubner | 358/183 |
| 5,138,452 | 8/1992 | Soloff | 358/166 |

FOREIGN PATENT DOCUMENTS

0239243A3 9/1987 European Pat. Off. ...... H04N 5/268
0264966A3 4/1988 European Pat. Off. ........ H04N 7/01

Primary Examiner—Victor R. Kostak
Assistant Examiner—Michael H. Lee
Attorney, Agent, or Firm—Limbach & Limbach

[57] ABSTRACT

A digital video effects generator includes: means for up-sampling the digital video component signals prior to their spatial transformation and linear interpolation, thereby reducing losses due to the (sin x)/x frequency response of the sampled video signal; means for spatially-mapping video motion data representing the degree of video data motion between temporally adjacent video frames and for motion adaptive interpolation to selectively blend interpolated video field data in accordance therewith; means for pre-transform keying, thereby allowing two video signal transformations to be keyed simultaneously; means for selectively transforming portions of input video signals, thereby allowing selective keying of non-spatially transformed video into selected regions of the video image; means for selectively linking keyframes within separate effects and providing smooth parametric transitions therebetween, thereby allowing several separate effects to be combined into a single effect with smooth parametric transitions between the linked (inter-effect) keyframes; and means for maintaining "pinned" image corners during parametric transitions between keyframes.

54 Claims, 10 Drawing Sheets

Microfiche Appendix Included
(168,2 Microfiche, Kostak; Victor R. Pages)

DIGITAL VIDEO EFFECTS GENERATOR

DIGITAL VIDEO EFFECTS GENERATOR

VIDEO INPUT TRANSFORM/KEYER

VIDEO MOTION DETECTOR

MOTION ADAPTIVE INTERPOLATION

LUMINANCE INTERPOLATOR
(ALTERNATE PREFERRED EMBODIMENT)

FIG. 8 LUMINANCE INTERPOLATOR (PREFERRED EMBODIMENT)

FIG. 9 EFFECTS LINKAGE

CORNER MOTION

DIGITAL VIDEO EFFECTS GENERATOR

This application is submitted with a microfiche appendix containing copyrighted material, copyright 1990 and 1991, Abekas Video Systems, Inc. The appendix consists of two microfiche transparencies with a total of 180 frames. The copyright owner has no objection to the facsimile reproduction by anyone of the patent document or the patent disclosure, as it appears in the Patent and Trademark Office patent file or records, but otherwise reserves all copyright rights whatsoever in the appendix.

BACKGROUND OF THE INVENTION

1. Field of the Invention

The present invention relates to a digital video effects generators, and in particular, to read-side digital video effects generators.

2. Description of the Related Art

Digital video effects systems, including digital video effect generators and video combiners, are well known and widely used in the art. Generally, a digital video effects system receives at least two video input signals, with one selected for use as a video fill signal and the other selected for use as a video background signal. This selection involves another input signal, i.e. a key signal, which selectively keys the fill video over the background video. If the video input signals are digital, they are typically in accordance with the SMPTE D1 standard. However, sometimes one or more of the input signals may be in accordance with the SMPTE D2 standard, thereby requiring conversion to the SMPTE D1 standard. These video signals can then be processed in accordance with a number of well known video effects. For example, the fill video can be keyed onto the background video with perspective or rotational effects, or a video image can be constructed which appears to be a three-dimensional object with fill video occupying the faces of the object. While all of the foregoing, and much more, can be achieved with conventional digital video effects systems, many limitations have existed.

One problem in conventional digital video effects systems involves the sampling of analog video signals to produce the digital video input signals. A conventional system often uses a sampling frequency of approximately 13.5 MHz in accordance with the SMPTE D1 standard. With the luminance bandwidth of an NTSC compatible component video signal being approximately 5.5 MHz, substantial signal sampling losses often result. Although the Nyquist sampling criterion is fulfilled by virtue of the sampling frequency being at least twice as high as the luminance bandwidth, the higher frequency components of the luminance signal nonetheless experience significant aperture loss, due to the $(\sin x)/x$ frequency response of the sampled video signal.

Further, and worse, losses are incurred with a conventional digital video effects system where spatial transformations are performed using linear interpolation. For example, generating subpixel offsets has the effect of lowering the apparent sampling frequency, thereby effectively placing the frequency responses of the sampled signals even further out on the $(\sin x)/x$ frequency response curve.

Another problem with conventional systems involves video motion detection. Some systems use video motion detectors for determining whether the subject matter of a video image has moved between temporally adjacent fields. Current advanced video motion detectors use a threshold detector, which means that compensation for such motion is binary. In other words, either full motion compensation or no compensation is provided to the video information. This results in objectionable and perceptible mode changes.

A problem related to the foregoing involves the use of keyed transformations of an incoming video signal. Non-spatial transformations (e.g. blur or mosaic) are typically done according to a key signal in a binary manner, i.e. the incoming video information is either transformed fully or not at all according to whether and when the key signal exceeds a threshold. This also often results in undesirably distorted images.

Another problem with conventional systems involves their use for spatial transformations (e.g. constructing three-dimensional images). Conventional generators use only post-transform keyers. Output keying of the fill and background video signals is not done until after transformation of the video. Thus, whenever keyed transformations (e.g. spatial or non-spatial) are to be used, multiple edit passes are required, i.e. one for each transformation.

SUMMARY OF THE INVENTION

A digital video effects generator in accordance with the present invention provides means for up-sampling the digital video component signals prior to their spatial transformation and linear interpolation. This up-sampling of the video signal increases the effective signal sampling frequency, thereby reducing losses due to the $(\sin x)/x$ frequency response of the sampled video signal. Further, this increase of the effective sampling frequency counteracts the apparent reduction in the sampling frequency introduced by linear interpolation of the spatially transformed video signal.

A digital video effects generator in accordance with the present invention provides means for spatially-mapping video motion data representing the degree of video data motion between temporally adjacent video. The present invention further provides means for motion adaptive interpolation for selectively blending interpolated video field data in accordance with the spatially-mapped video motion data.

A digital video effects generator in accordance with the present invention provides means for pretransform keying. The pre-transform keying, in association with output keying (e.g. for spatial transformations) allows two video signal transformations (e.g. non-spatial and spatial) to be keyed simultaneously, thereby reducing the number of editing passes required.

A digital video effects generator in accordance with the present invention provides means for selectively transforming portions of input video signals. Non-spatial transformation of an input video signal can be selectively keyed into selected regions of the video image.

These and other objectives, features and advantages of the present invention will be understood upon consideration of the following detailed description of the invention and the accompanying drawings.

DETAILED DESCRIPTION OF THE INVENTION

Throughout the following description, references to signal formats, frequencies and bandwidths reflect the use of a preferred embodiment of the present invention with video according to the NTSC video standard or component video suitable for encoding according to the NTSC standard. However, it should be understood that alternative embodiment of the present invention for systems operating according to other video standards, such as PAL or SECAM, can also be realized in accordance with the following discussion.

The present invention can be used in association with the apparatuses and methods disclosed in the following commonly assigned, copending patent applications: Ser. No. 07/677,382, entitled "An Improved Networked Modular Video Processing System" and filed by Beaulier et al. on Mar. 28, 1991; Ser. No. 07/677,382, entitled "A Video Processing System Having Improved Graphics Display And Performance" and filed by Beaulier on Mar. 28, 1991; Ser. No. 07/678,042, entitled "A Video Processing System With Improved Graphical Control And Real Time Interaction With External Devices" and filed by Bershtein et al. on Mar. 28, 1991; Ser. No. 07/678,041, entitled "A Video Processing System Having Improved Internal Switching Capability" and filed by Beaulier et al. on Mar. 28, 1991; Ser. No. 07/678,011, entitled "A Video Processing System Having Improved Transition Control And Display" and filed by Pelley on Mar. 28, 1991; Ser. No. 07/698,012, entitled "A Video Processing System Having Improved Interface With External Devices" and filed by Bershtein on Mar. 28, 1991; Ser. No. 07/677,381, entitled "A Video Processing System Having Improved Synchronization" and filed by Griffen on Mar. 28, 1991; Ser. No. 07/677,790, entitled "Digital Special Effects Video Generator With Three-Dimensional Image Generator" and filed by Wolfe and Rolhfs on Mar. 29, 1991; Ser. No. 07/685,125, entitled "Improved Digital Video Effects Generator" and filed by Wolfe and Kulmaczewski on Apr. 12, 1991; Ser. No. 07/685,225, entitled "Improved Video Combiner" and filed by Ritter on Apr. 12, 1991; and Ser. No. 07/685,541, entitled "Video Sample Rate Converter" and filed by Andrews, Antonio and Bennett on Apr. 12, 1991. The specifications of the foregoing patent applications are incorporated herein by reference.

Figure 1:
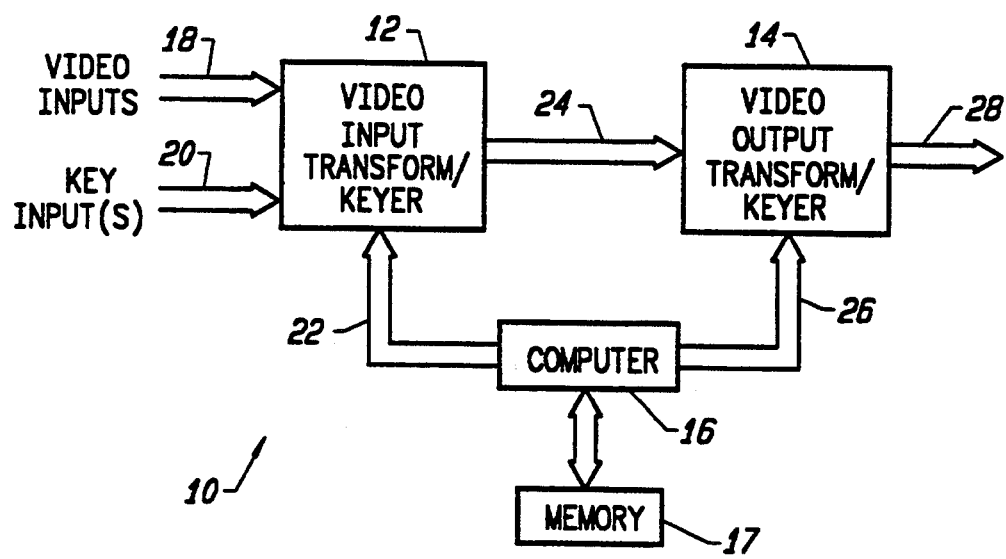
FIG. 1 is a functional block diagram of a digital video effects generator in accordance with the present invention.

Referring to FIG. 1, a digital video effects generator 10 in accordance with the present invention includes a video input transform/keyer 12, a video output transform/keyer 14, a computer 16 and a memory 17, substantially as shown. As discussed more fully below, the video input transform/keyer 12 receives video inputs 18 and key inputs 20 which, in accordance with control data 22 from the computer 16, produces a plurality of transformed, keyed or otherwise derived signals 24. Also as discussed more fully below, the video output transform/keyer 14 receives these signals 24 and, in accordance with control data 26 from the computer 16, produces a plurality of output signals 28.

Figure 2:
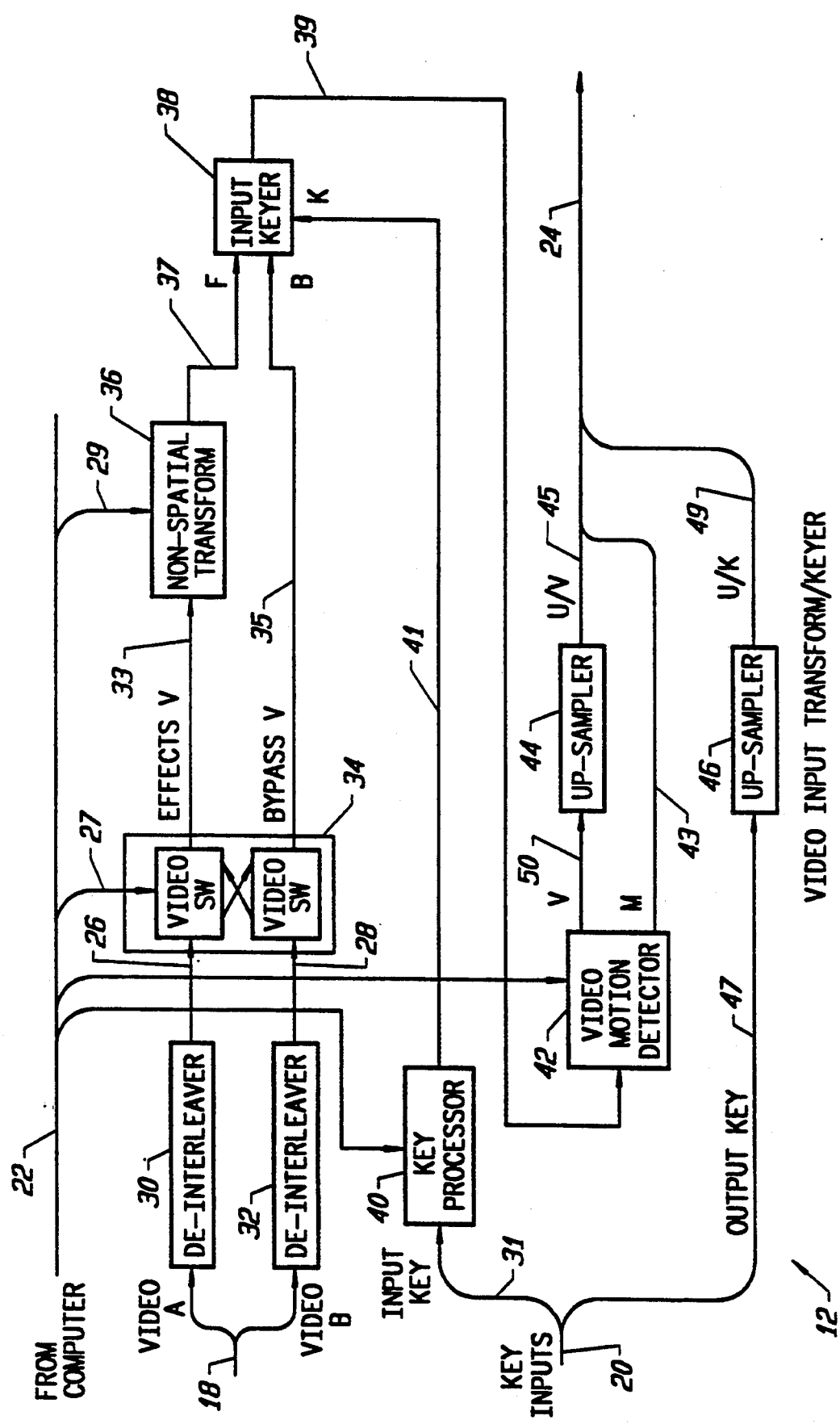
FIG. 2 is a functional block diagram of the video input transform/keyer of FIG. 1.

Referring to FIG. 2, a video input transform/keyer 12 in accordance with the present invention includes, substantially as shown: video de-interleavers 30, 32; a video signal selector 34; a non-spatial transform processor 36; an input keyer 38; a key processor 40; a video motion detector 42; and up-samplers 44, 46.

Two input video signals 18 are received and deinterleaved by their respective de-interleavers 32. The de-interleaved signals 26, 28 are selectively switched, i.e. routed, by the video selector 34 in accordance with control data 27 from the computer 16 to produce effects 33 and bypass 35 video signals. The de-interleaved signals 26, 28 can be switched by the video selector 34 such that both the effects 33 and bypass 35 video signals originate from either one of the de-interleaved signals 26, 28 (thereby using the video selector 34 more as a signal divider or splitter).

The effects video signal 33 is selectively nonspatially transformed (e.g. blur, mosaic) by the nonspatial transform processor 36 according to control data 29 from the computer 16. The selectively transformed signal 37 is used as the fill video signal for the input keyer 38. The bypass video signal 35 is used as the background video signal.

These fill 37 and background 35 signals are linearly keyed according to a selectively processed key signal 41 to produce the input keyed signal 39. One of the key input signals 20 is used as an input key 31 to a key processor 40 to produce the selectively processed input key signal 41. This input key signal 41 is selectively processed by the key processor 40 according to control data received from the computer 16. For example, the input key 31 can be selectively shaped or time-delayed to produce a processed input key signal 41 which, in turn, produces an input keyed signal 39 having selectively controllable characteristics or effects (e.g. "windowed"). In particular, when the video selector 34 has selected one of the de-interleaved signals 26, 28 to be both the effects 33 and bypass 35 video signals, the input keyed signal 39 can represent a video image wherein only a selected portion has been selectively transformed, in accordance with the processed input key signal 41.

The input keyed signal 39 is processed by a video motion detector 42 (discussed more fully below) according to control data from the computer 16 to produce motion data 43, before being processed by an up-sampler 44 (discussed more fully below). The motion data 43 represents relative motion, i.e. the degree of motion, between corresponding video data points, i.e. pixels, within temporally adjacent video (e.g. frames).

One of the key input signals 20, representing an output key signal 47, is also processed by an up-sampler 46 (discussed more fully below). The up-sampled video signal 45, motion data 43 and up-sampled key signal 49 make up the output signals 24 of the video input transform/keyer 12.

Figure 3:
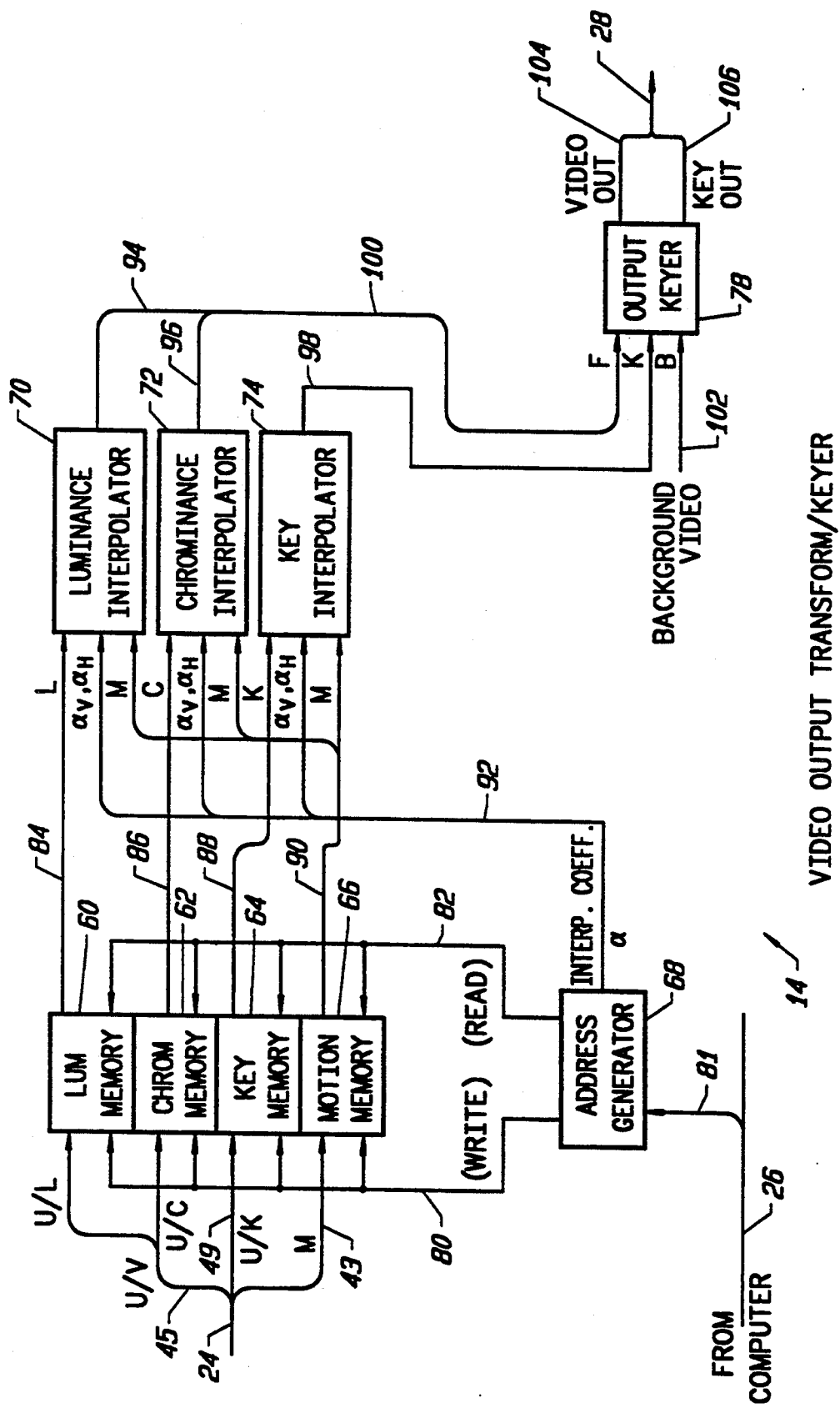
FIG. 3 is a functional block diagram of the video output transform/keyer of FIG. 1.

Referring to FIG. 3, a video output transform/keyer 14 in accordance with the present invention includes the following components, substantially as shown: luminance 60, chrominance 62, key 64 and motion 66 memories; an address generator 68; luminance 70, chrominance 72 and key 74 interpolators; and an output keyer 78.

The memories 60, 62, 64, 66 receive the output signals 24 from the video input transform/keyer 12. The upsampled luminance and chrominance components of the up-sampled video signal 45 are stored in the luminance 60 and chrominance 62 memories, respectively. The up-sampled key signal 49 is stored in the key memory 64, and the motion data 43 is stored in the motion memory 66. These input signals 45, 43, 49 are written into the memories 60, 62, 64, 66 according to write address data 80 generated by the address generator 68 in accordance with a two-dimensional, i.e. raster, format.

These stored signals are read out from the memories 60, 62, 64, 66 as spatially transformed luminance 84, chrominance 86, key 88 and motion 90 data in accordance with read address data 82 generated by the address generator 68 according to a three-dimensional (i.e. spatially transformed) format. The write 80 and read 82 address data are generated by the address generator 68 in accordance with control data 81 received from the computer 16.

The luminance 84, chrominance 86 and key 88 data are interpolated by their respective luminance 70, chrominance 72 and key 74 interpolators. These interpolators 70, 72, 74 receive their interpolation coefficients 92 from the address generator (according to control data 81 from the computer 16). As discussed further below, these interpolators 70, 72, 74 each include multiple linear interpolators for interpolating between corresponding video data points, i.e. pixels, within temporally adjacent video fields. The interpolated luminance 94, chrominance 96 and key 98 signals include horizontally and vertically interpolated video field data for temporally adjacent video fields. As discussed further, these video data 94, 96, 98 have been motion adaptively interpolated by the interpolators 70, 72, 74 in accordance with the spatially-mapped (e.g. frame-mapped) motion data 90.

The spatially and motion adaptively transformed video 98 and key 102 signals serve as the fill video and key input signals for the output keyer 78, respectively. The output keyer 78 keys the transformed video fill signal 100 with the correspondingly transformed key signal 98 into a background video signal 102 to produce a keyed video output signal 104 and a key output signal 106.

The luminance 60, chrominance 62, key 64 and motion 66 data memories are preferably dual port. random access memories to facilitate the independent input write and output read operations, as discussed above. The address generator 68 generates the write 80 and read 82 address data in accordance with well-known spatial transformation principles. Further information on such an address generator can be found in the aforementioned commonly assigned, copending patent application entitled "Digital Special Effects Video Generator With Three-dimensional Image Generator."

Figure 4:
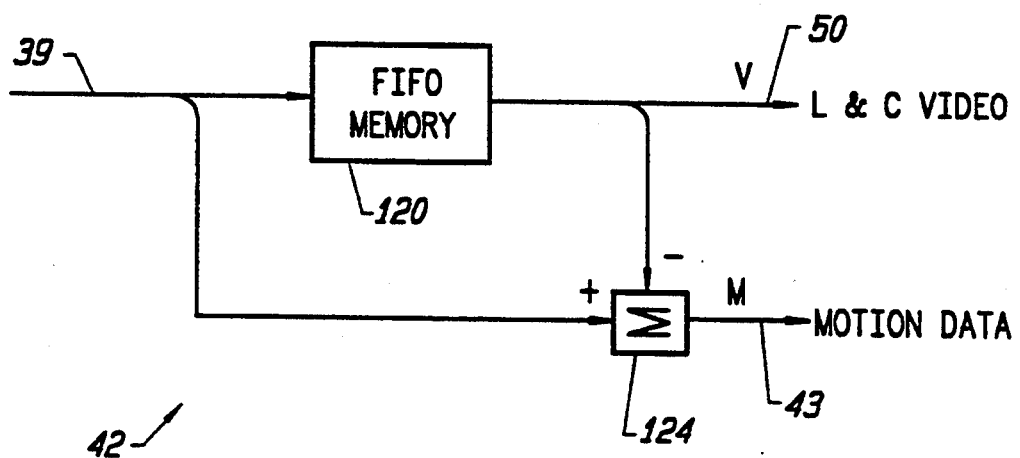
FIG. 4 is a functional block diagram of the video motion detector of FIG. 2.

Referring to FIG. 4, a video motion detector 42 in accordance with the present invention includes a first-in, first-out ("FIFO") memory 120 (preferably a plurality of video field FIFOs, such as the TMS4C1050 manufactured by Texas Instruments ®) and an adder 124, substantially as shown. The input keyed signal 39 is stored in and read out from the FIFO 120 (delayed by one frame). The input 39 and output 50 data of the FIFO 120 are differentially summed in the adder 124 to produce the motion data 43. As discussed above, this motion data 43 represents relative motion between corresponding video data points within temporally adjacent video (e.g. frames), as represented by the difference between the input keyed video signal 39 and its time-delayed equivalent signal 50. This video motion detector 42 advantageously generates spatially-mapped video motion data providing pixel-by-pixel information regarding the degree of relative motion between temporally adjacent video. As discussed above, this motion data 43, once spatially transformed, is used to selectively scale the relative contributions of the video data within temporally adjacent video fields on a pixel-by-pixel basis.

Figure 5:
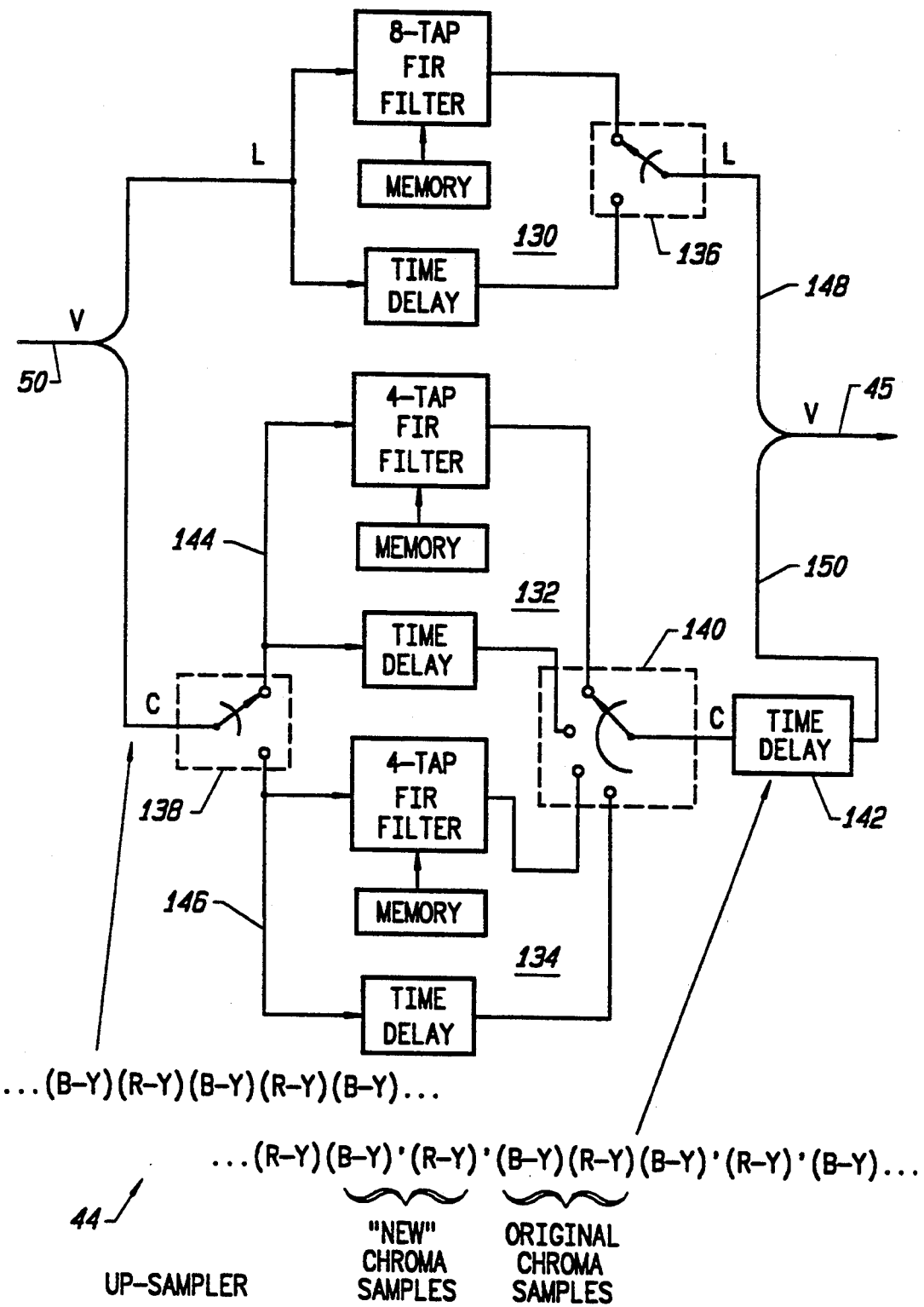
FIG. 5 is a functional block diagram of an up-sampler of FIG. 2.

Referring to FIG. 5, an up-sampler, such as the upsampler 44 for the video signal 50 discussed above, includes the following elements, substantially as shown: three multi-tap digital finite impulse response ("FIR") filter assemblies 130, 132, 134; an output luminance signal commutator 136; an input chrominance signal commutator 138; an output chrominance signal commutator 140; and a time delay element 142.

The luminance component of the video signal 50 is digitally filtered by an 8-tap FIR filter assembly 130. The interleaved chrominance component of the video signal 50 is de-interleaved by the input chrominance signal commutator 138, and the deinterleaved chrominance components 144, 146 are digitally filtered by their respective 4-tap FIR filter assemblies 132, 134. These multi-tap FIR filter assemblies 130, 132, 134 use conventional digital FIR filter designs and operate according to well-known principles.

The filtered and time-delayed outputs of the FIR filter assemblies 130, 132, 134 are interleaved by the output luminance 136 and chrominance 140 signal commutators. The re-interleaved chrominance component signal is time-delayed by the time delay element 142 to compensate for the difference in time delays between the 8-tap 130 and 4-tap 132, 134 FIR filter assemblies. These up-sampled luminance 148 and chrominance 150 component signals make up the up-sampled video signal 45 discussed above.

Figure 6:
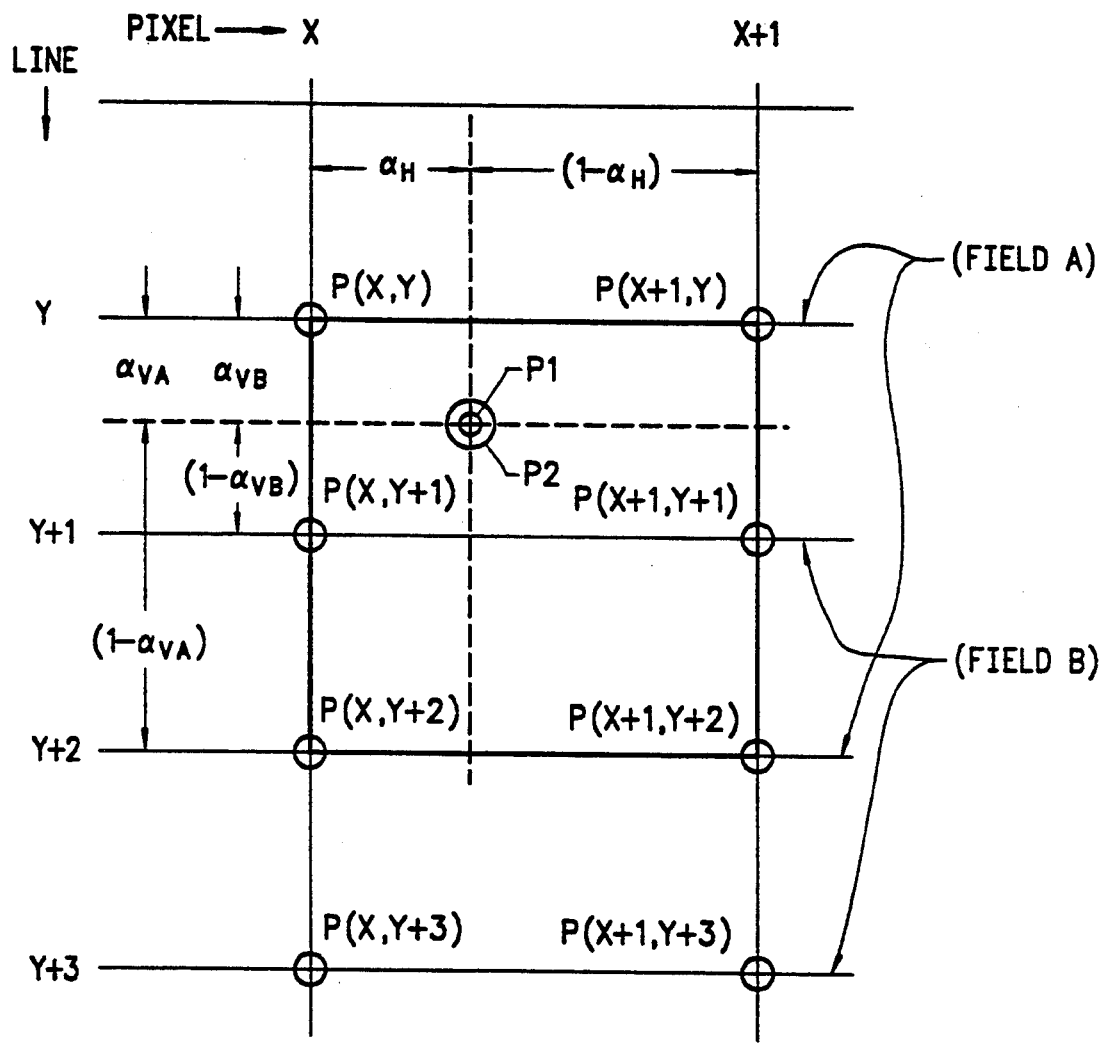
FIG. 6 is a graphical diagram representing video motion data interpolation.

Referring to FIG. 6, the operation of the luminance 70, chrominance 72 and key 74 interpolators is discussed, in this case for the luminance interpolator 70. Operation of the chrominance 72 and key 74 interpolators is similar, with chrominance or key video data substituted for the luminance video data.

Referring to FIG. 6 again, a region of video data within which interpolation is to take place includes pixel coordinates corresponding to pixels X and X+1, and line coordinates corresponding to lines Y, Y+1 and Y+2. When field A is the current video field, vertical interpolation is only required within the display region bounded by the rectangle having corners identified by pixels P(X,Y), P(X+1,Y), P(X,Y+1) and P(X+1,Y+1). Therefore no interpolation is needed involving the field B video data representing the pixels P(X,Y+3) and P(X+1,Y+3) which are outside this region. It should be noted here that when field B is the current field, i.e. when field B is the video field currently being outputted for display, the foregoing discussion, as well as the discussion that follows herein, applies, however, the line count is incremented or decremented by one.

Luminance video data corresponding to co-located pixel points P1 (associated with video field A) and P2 (associated with video field B) is found by interpolating the relative contributions of the video data representing the four field A pixels P(X,Y), P(X,Y+2), P(X+1,Y) and P(X+1,Y+2) and the video data representing the field B pixels P(X,Y+1) and P(X+1,Y+1). The relative contributions of each of the foregoing pixels' video data is computed in accordance with the field A and field B vertical interpolation coefficients $\alpha_{VA}$, $\alpha_{VB}$ and the motion adaptive interpolation coefficients $\alpha_M$. Mathematically, vertical interpolation of field A and field B data is performed in accordance with the following formula:

$$L_I = [P(X,Y)^*\alpha_{VA} + P(X,Y+2)^*(1-\alpha_{VA})]^*\alpha_M \\ + [P(X,Y)^*\alpha_{VB} + P(X,Y+1)^*(1-\alpha_{VB})]^*(1-\alpha_M)$$

where:
$L_I$ = interpolated luminance data 94 (e.g. at point P1)
P(a,b) = pixel data at pixel a on line b
$\alpha_{VA}$ = vertical interpolation coefficient for field A
$\alpha_{VB}$ = vertical interpolation coefficient for field B
$\alpha_M$ = motion adaptive interpolation coefficient from spatially-mapped motion data 90

Figure 7:
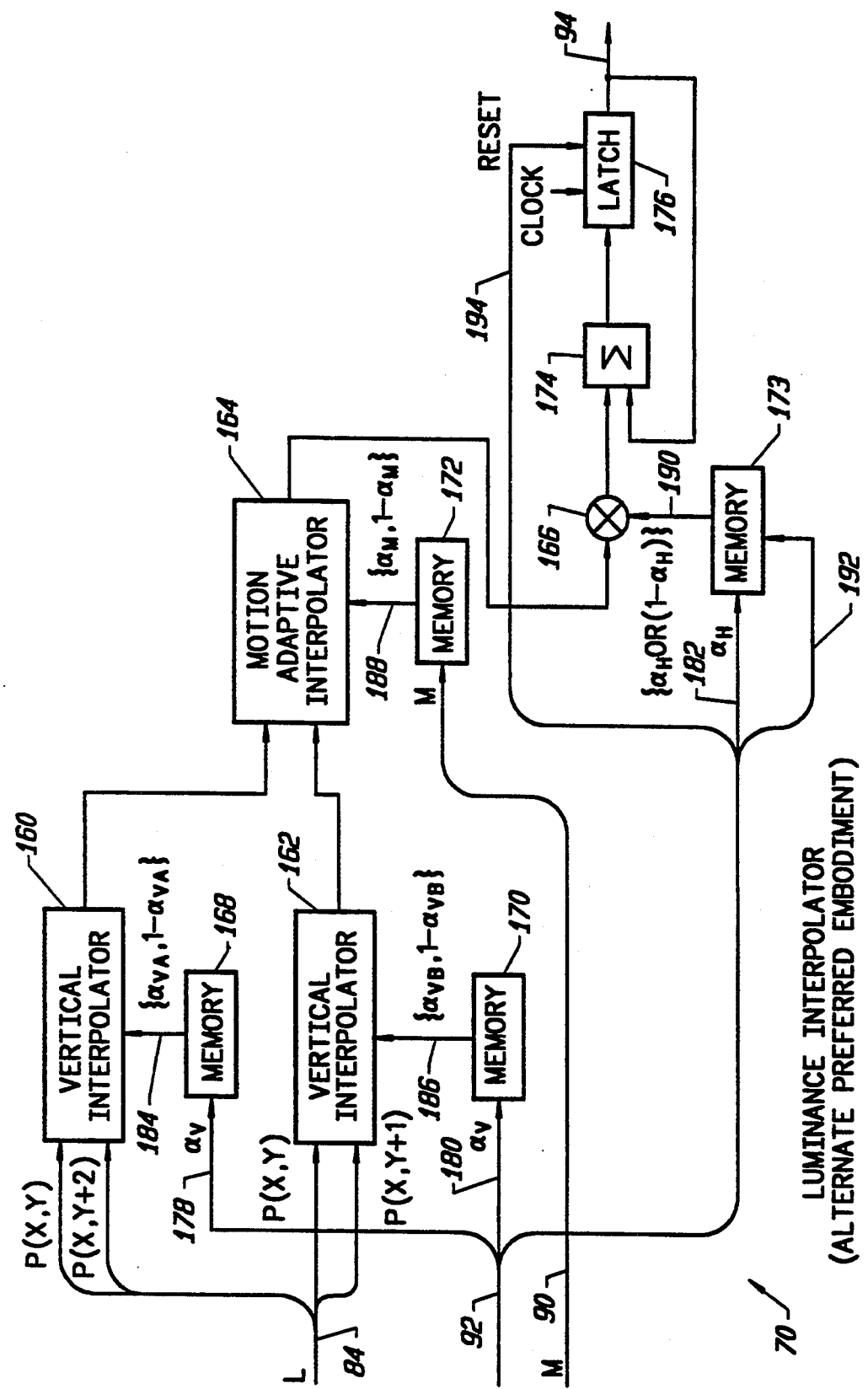
FIG. 7 is a functional block diagram of an alternative preferred embodiment of the luminance interpolator of FIG. 3.

Referring to FIG. 7, a functional block diagram of an alternate preferred embodiment of the luminance interpolator 70 is illustrated. (The preferred embodiment is discussed further below.)

In this alternative preferred embodiment of the luminance interpolator 70, linear interpolators 160, 162, 164 and a multiplier 166 linearly interpolate the field A and field B pixels, as discussed above, in accordance with the vertical 178, 180 and horizontal 182 interpolation coefficients (from the address generator 68 in FIG. 3), and the spatially-mapped motion data 90. The interpolation coefficients 178, 180, 182 from the address generator 68 and the motion data 90 from the motion memory 66 are used to address memories 168, 170, 172, 173 (e.g. look-up tables) for providing the desired, respective interpolation coefficients sets $\{\alpha_{VA}, (1-\alpha_{VA})\}$184, $\{\alpha_{VB}, (1-\alpha_{VS})\}$186, $\{\alpha_M, (1-\alpha_M)\}$188, $\{\alpha_H$ or $(1-\alpha_H)\}$90 to the vertical interpolators 160, 162, motion adaptive interpolator 164 and multiplier 166.

After vertical and motion adaptive interpolation has been done, the multiplier performs the horizontal interpolation in accordance with "left/right pixel" control data 192 from the address generator 68 (FIG. 3). This control data 192 represents whether pixel data having pixel coordinates corresponding to X ("left" per FIG. 6) or X+1 ("right" per FIG. 6) are involved in the present horizontal interpolation. Referring back to FIG. 6, when "left" pixel data (pixel coordinates correspond to X) are involved in the present horizontal interpolation, then the horizontal interpolation coefficient $\alpha_H$ is used. However, when "right" pixel data (pixel coordinates correspond to X+1) are involved in the present horizontal interpolation, then the modified horizontal interpolation coefficient $(1-\alpha_H)$ is used.

Horizontal interpolation is completed by the action of the adder 174 and latch 176 which sum the results associated with adjacent pixels having pixel coordinates corresponding to X and X+1. The reset signal 194 for the latch 176 resets the output 94 of the latch 176 every other pixel in accordance with the "left/right pixel" control data 192.

The foregoing mathematical expression for interpolating luminance video data can be simplified by referring back to FIG. 6 and recognizing the following mathematical relationship between field A video data interpolation coefficients $\alpha_{VA}$ and field B video data vertical interpolation coefficients $\alpha_{VB}$:

$$\alpha_{VB} = 1 - [2^*(1-\alpha_{VA})]$$

Figure 8:
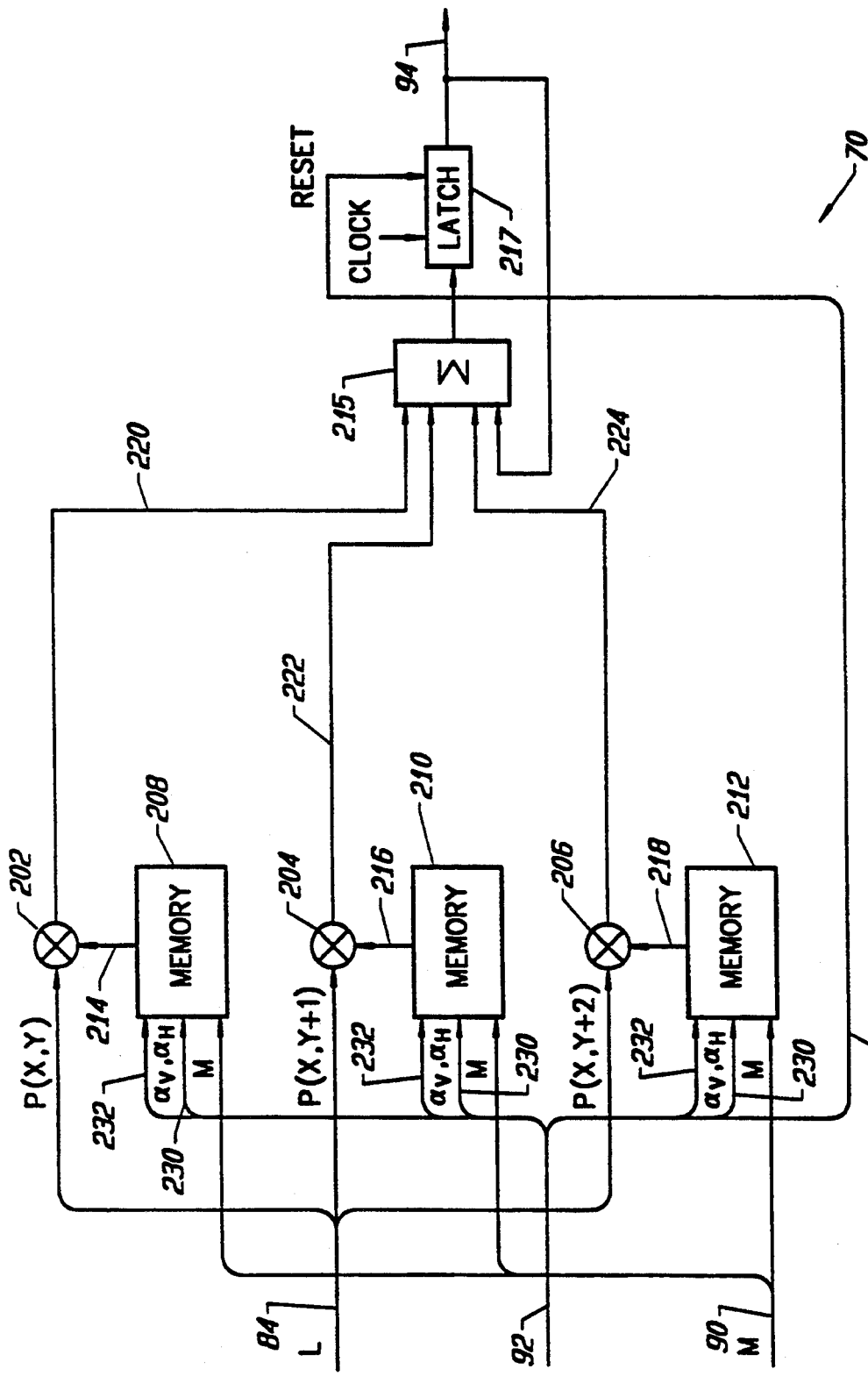
FIG. 8 is a functional block diagram of a preferred embodiment of the luminance interpolator of FIG. 3.

By recognizing this relationship, the mathematical expression further above for the interpolated luminance video data $L_I$ simplifies to the following:

$$L_I = P(X,Y)^*K_1 + P(X,Y+1)^*K_2 + P(X,Y+2)^*K_3$$

where:
$K_1 = \alpha_{VA}^*\alpha_M + \alpha_{VB}^*(1-\alpha_M)$
$K_2 = (1-\alpha_{VB})^*(1-\alpha_M)$
$K_3 = (1-\alpha_{VA})^*\alpha_M$ In accordance with this simplified expression, a preferred embodiment of the luminance interpolator 70 in accordance with the present invention is shown in FIG. 8. Three multipliers 202, 204, 206, receive the video data representing the pixels P(X,Y), P(X,Y+1) and P(X,Y+2). Memories (e.g. look-up tables) 208, 210, 212 provide the coefficients sets 214, 216, 218 for multiplying with the video data 84.

The memories 208, 210, 212 are addressed in accordance with the vertical and horizontal interpolation coefficients 230 and "left/right pixel" control data 232 (see discussion above) from the address generator 68 (FIG. 3), and the spatially-mapped motion data 90 from the motion memory 66. The contents of the memories 208, 210, 212 contain the values for the coefficients $K_1$, $K_2$ and $K_3$ (as defined above) and for the horizontal interpolation coefficients $\alpha_H$ and the modified horizontal interpolation coefficients $(1-\alpha_H)$. The coefficients $K_1$, $K_2$, $K_3$, as noted above, include interpolation information relating to field A and field B vertical interpolations and motion adaptive interpolation according to the motion data 90.

The resulting products, 220, 222, 224 are summed by an adder 215. The adder 215 and its accompanying latch 217 complete the horizontal interpolation. The output of the latch 94 is fed back and added with the aforementioned products 220, 222, 224 in the adder 215. By clocking the latch 217 and resetting it with a reset signal 242 (which is associated with the "left/right pixel" control data 232 as discussed further above) after every other pixel (e.g. after X and X+1), horizontal interpolation of the products 220, 222, 224 is completed for video data corresponding to pixels having pixel coordinates X and X+1.

Two separate simultaneous vertical interpolations are performed. One vertical interpolation is in accordance with the field A (i.e. the current field) vertical interpolation coefficient $\alpha_{VA}$ and produces a vertically interpolated data point using intra-field data P(X,Y), P(X,Y+2), i.e. data solely from within field A. The second vertical interpolation is with the field B (i.e. the noncurrent field) vertical interpolation coefficient $\alpha_{VB}$ and produces a second interpolated data point P2 using inter-field (e.g. intra-frame) data P(X,Y), P(X,Y+1), i.e. data from within fields A and B.

The resultant interpolated data points P1 and P2 of these two vertical interpolations are selectively blended in accordance with the motion adaptive interpolation coefficient $a_M$. Where field A is the current field and no relative video motion has occurred between temporally adjacent video (e.g. frames), the relative contribution from the inter-field data point P2 is maximized and the relative contribution from the intra-field data point P1 is minimized. However, where field A is the current field and relative video data motion has occurred between temporally adjacent video, the relative contribution from the inter-field data point P2 is minimized and the relative contribution from the intra-field data point P1 is maximized. Thus, as between temporally adjacent video (e.g. frames), where no relative motion has occurred, the relative contributions from the inter-field and intra-field interpolated data points are maximized and minimized, respectively; where relative motion has occurred, the relative contributions from the inter-field and intra-field interpolated data points are minimized and maximized, respectively.

Such selective scaling or blending of the relative contributions of intra-field data and interfield (e.g. intra-frame) data can be realized by selectively varying the adaptive motion interpolation coefficients $a_M$. Further, the adaptive motion interpolation coefficients $a_M$ can be selectively varied in accordance with the degree of relative video data motion between the temporally adjacent video, thereby providing a continuum of motion adaptive interpolation.

The desired values of the adaptive motion interpolation coefficients $a_M$, as well as the vertical $a_{VA}$, $a_{VS}$ and horizontal $a_H$ interpolation coefficients can be selectively combined and stored in the interpolator memories 208, 210, 212 shown in FIG. 8 (or memories 168, 170, 172, 173 shown in FIG. 7).

Figure 9:
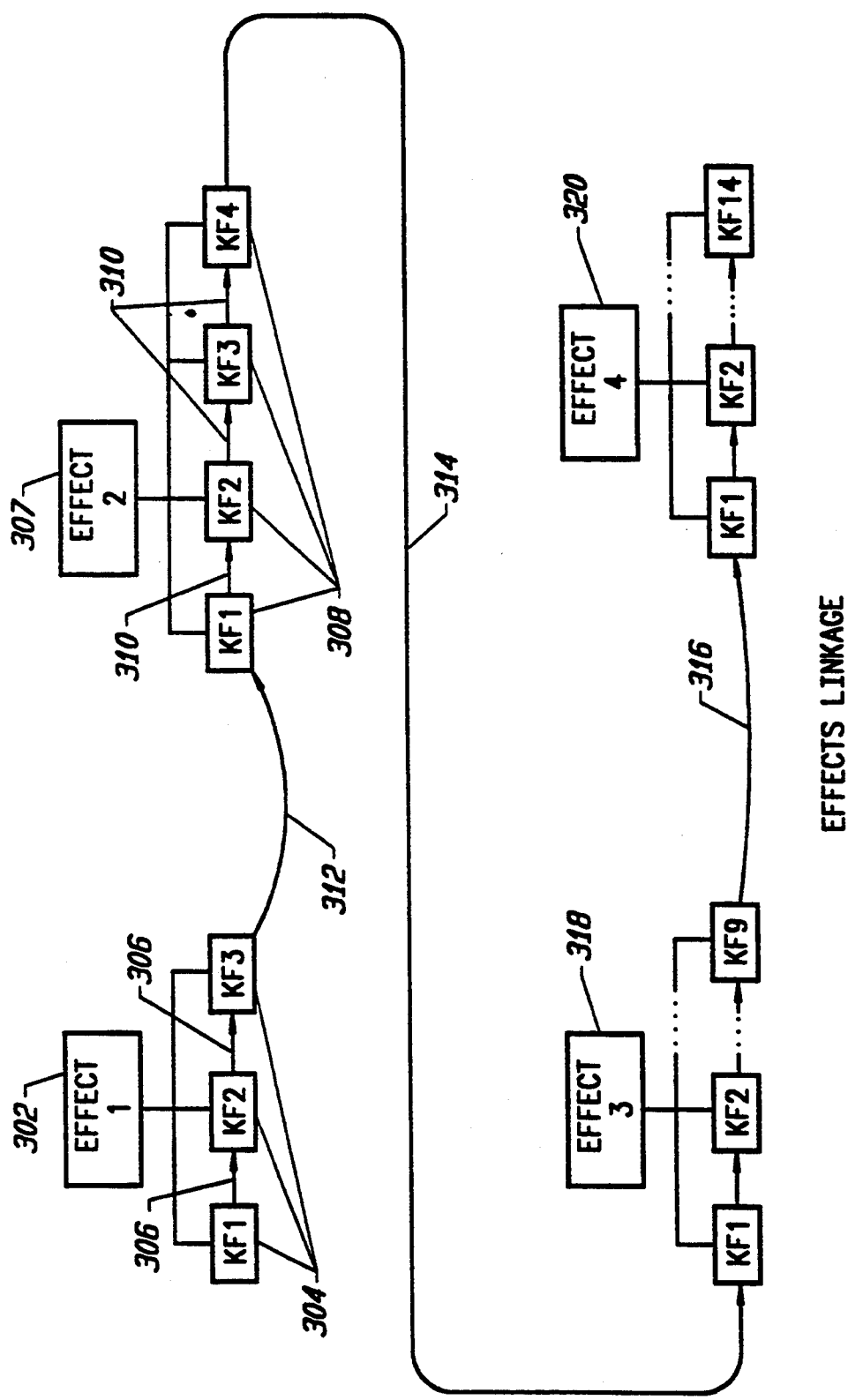
FIG. 9 illustrates linkage of inter-effects' keyframes.

Referring to FIG. 9, a digital video effects generator in accordance with the present invention provides the capability to store (e.g. in the memory 17 in FIG. 1) a list of effects to be performed and smoothly link them together (e.g. via linear interpolation or splining in the computer 16) for execution as a single effect. For example, a first effect 302, consisting of three keyframes 304 with inter-keyframe transitions 306, can be "linked" with a second effect 307, having four keyframes 308 with inter-keyframe transitions 310. The present invention provides means for linking the last keyframe KF3 of effect one 302 to the first keyframe KF1 of the second effect 307. This "linkage" 312 is provided by programming the computer 16 to selectively linearly interpolate or spline the corresponding parametric data (as stored in the memory 17) from the last keyframe KF3 of the first effect 302 and the first keyframe KF1 of the second effect 307.

Similarly, additional linkages 314, 316 can be provided between the second 307 and third 318 effects and the third 318 and fourth 320 effects, respectively. In a preferred embodiment of the present invention, as indicated with the computer program listed in the attached microfiche appendix, only immediately adjacent effects can be linked. However, it should be understood that, in accordance with the present invention, the computer 16 can be alternatively programmed to selectively link the stored keyframes of the effects according to any desirable order.

Figure 10:
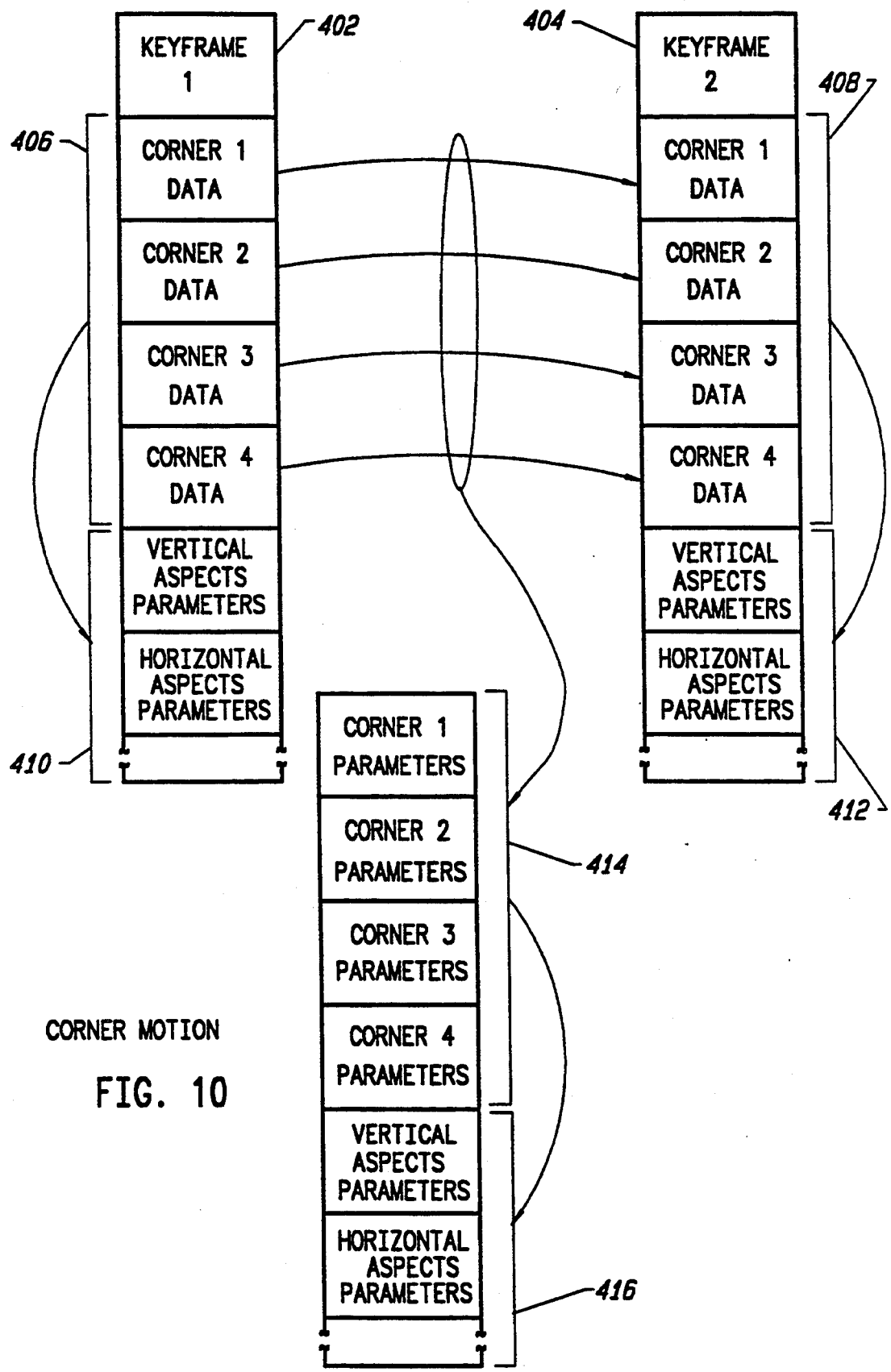
FIG. 10 illustrates the derivation of corner parameters for stabilizing corner-pinned images during inter-keyframe transitions.

Referring to FIG. 10, a digital video effects generator in accordance with the present invention provides an improved means for modifying the spatial projection of an image that has undergone corner-pinning in real time. Two keyframes 402, 404 which have been corner-pinned (e.g. in accordance with U.S. Pat. No. 4,951,040) and stored in the memory 17 (FIG. 1) each contain corner data 406, 408 representing the four corners of the keyframe images. Computed from these corner data 406, 408 (by the computer 16) are multiple spatial transform parameters (e.g. vertical and horizontal aspect parameters) 410, 412.

In accordance with the computer program listed in the attached microfiche appendix, the computer 16 linearly interpolates, or splines, the position of each corner of the pinned planes within the stored keyframes 402, 404 on a field-by-field basis. The results of these interpolations are stored in the memory 17 as corner parameters 414. In turn, these corner parameters 414 are used by the computer 16 to compute new spatial transform parameters (e.g. new vertical and horizontal aspect parameters) 416 corresponding thereto. This results in a transition image having corners which are pinned, or mutually stationary with respect to one another, during the transition from the first keyframe 402 to the second keyframe 404.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A digital video effects generator for increasing the effective sampling frequency of and selectively spatially transforming a digital video signal, said digital video effects generator comprising:

up-sampler means for receiving and up-sampling an input digital video signal;

transformation means for receiving and selectively spatially transforming said up-sampled digital video signal; and interpolator means for receiving and interpolating said selectively spatially transformed, up-sampled digital video signal.

2. A digital video effects generator for interpolating selectively spatially transformed digital video signal data in accordance with video motion data representing relative video data motion between temporally adjacent video signal data sets, said digital video effects generator comprising:

detector means for receiving digital video signal data including a plurality of video signal data sets, for detecting relative video data motion between temporally adjacent video signal data sets among said plurality of video signal data sets, and for providing spatially-mapped video motion interpolation coefficient data corresponding to said detected relative video data motion;

video transformation means for further receiving said digital video signal data, for selectively spatially transforming said received digital video signal data, and for providing video interpolation coefficient data, wherein the spatial transformation of said selectively spatially transformed digital video signal data corresponds to the spatial mapping of said spatially-mapped video motion interpolation coefficient data; and interpolator means for receiving said selectively spatially transformed digital video signal data, said video interpolation coefficient data and said spatially-mapped video motion interpolation coefficient data, and for interpolating said received, selectively spatially transformed digital video signal in accordance with said received video interpolation coefficient data and said received spatially-mapped video motion interpolation coefficient data.

3. A digital video effects generator for selectively keying, spatially transforming and re-keying a digital video signal, said digital video effects generator comprising:

first transformation means for receiving and selectively transforming a digital video signal;

input keyer means for receiving said selectively transformed digital video signal, a first background digital video signal and an input key signal for selectively input keying said received, selectively transformed digital video signal onto said received, first background digital video signal in accordance with said received input key signal;

second transformation means for receiving and selectively spatially transforming said selectively input keyed digital video signal; and output keyer means for receiving said selectively spatially transformed digital video signal, a second background digital video signal and an output key signal, and for selectively output keying said received, selectively spatially transformed digital video signal onto said received, second background digital video signal in accordance with said received output key signal.

4. A digital video effects generator for selectively transforming a portion of a digital video signal, said digital video effects generator comprising:

receiver means for receiving an input digital video signal representing a video image and for providing therefrom first and second digital video signals, wherein said first and second digital video signals are substantially alike;

transformation means for receiving and selectively transforming said first digital video signal; and keyer means for receiving and selectively transformed first digital video signal, said second digital video signal and a key signal, and for selectively keying said received, selectively transformed first digital video signal onto said received second digital video signal in accordance with said received key signal.

5. A digital video effects generator as recited in claim 1, wherein said up-sampler means comprises at least one multi-tap digital finite impulse response filter for receiving said input digital video signal and for providing said up-sampled digital video signal.

6. A digital video effects generator as recited in claim 1, wherein said transformation means comprises:

memory means for receiving and storing said up-sampled digital video signal in accordance with a plurality of memory write addresses, and for outputting said stored digital video signal in accordance with a plurality of memory read addresses; and addressor means for selectively providing said pluralities of memory write and read addresses.

7. A digital video effects generator as recited in claim 6, wherein said memory means comprises a dual port random access memory.

8. A digital video effects generator as recited in claim 6, wherein said addressor means comprises an address generator coupled to said memory means for providing said pluralities of memory write and read addresses, and wherein said memory write addresses are incremented by a write value, said memory read addresses are incremented by a read value, and said write and read values are selectively dissimilar to render said outputted digital video signal spatially transformed relative to said stored digital video signal.

9. A digital video effects generator as recited in claim 1, wherein said interpolator means comprises a linear interpolator including at least one multiplier and a memory.

10. A digital video effects generator as recited in claim 2, wherein said detector means comprises:

storage means for storing said received digital video signal data and outputting said stored digital video signal data after a selected time period;

adder means for differentially adding said received digital video signal data and said stored and outputted digital video signal data to provide differential sum data representing said detected relative video data motion;

motion transformation means for receiving and selectively spatially transforming said differential sum data and for providing said selectively spatially transformed differential sum data; and motion coefficient generator means for receiving said selectively spatially transformed differential sum data and providing said spatially-mapped video motion interpolation coefficient data.

11. A digital video effects generator as recited in claim 10, whereins aid received digital video signal data includes a pluraity of video data frames, said storage means comprises a first-in, first-out memory, and said selected time period is approximately equivalent to that of one of said plurality of video data frames.

12. A digital video effects generator as recited in claim 10, wherein said motion transformation means comprises:

motion memory means for storing said received differential sum data in accordance with a plurality of motion memory write addresses, and for outputting said stored differential sum data in accordance with a plurality of motion memory read addresses; and motion addressor means for selectively providing said pluralities of motion memory write and read addresses.

13. A digital video effects generator as recited in claim 10, wherein said motion coefficient generator means comprises a look-up table for receiving said selectively spatially transformed differential sum data as input addresses and providing said spatially-mapped video motion interpolation coefficient data as output data.

14. A digital video effects generator as recited in claim 12, wherein said motion memory means comprises a dual port random access memory.

15. A digital video effects generator as recited in claim 12, wherein said motion addressor means comprises an address generator coupled to said motion memory means for providing said pluralities of motion memory write and read addresses, and wherein said motion memory write addresses are incremented by a motion write value, said motion memory read addresses are incremented by a motion read value, and said motion write and read values are selectively dissimilar to render said outputted differential sum data spatially transformed relative to said stored differential sum data.

16. A digital video effects generator as recited in claim 2, wherein said video transformation means comprises:

video memory means for storing said received digital video signal data in accordance with a plurality of video memory write addresses, and for outputting said stored digital video signal data in accordance with a plurality of video memory read addresses; and video addressor means for selectively providing said pluralities of video memory write and read addresses and said video interpolation coefficient data.

17. A digital video effects generator as recited in claim 16, wherein said video memory means comprises a dual port random access memory.

18. A digital video effects generator as recited in claim 16, wherein said video addressor means comprises an address generator coupled to said video memory means for providing said pluralities of video memory write and read addresses and coupled to said interpolator means for providing said video interpolation coefficient data, and wherein said video memory write addresses are incremented by a video write value, said video memory read addresses are incremented by a video read value, and said video write and read values are selectively dissimilar to render said outputted digital video signal data spatially transformed relative to said stored digital video signal data.

19. A digital video effects generator as recited in claim 3, wherein said first transformation means comprises a non-spatial transform processor.

20. A digital video effects generator as recited in claim 3, wherein said input keyer means comprises a multiplier and a plurality of adders coupled to input key said received, selectively transformed digital video signal onto said received first background digital video signal substantially in accordance with the formula:

$$VI = VT1(KI) + VB1(1-KI)$$

where:
VI = said input keyed signal
KI = said received input key signal
$0 \leq KI \leq 1$
VT1 = said received, selectively transformed digital video signal
VB1 = said received first background digital video signal.

21. A digital video effects generator as recited in claim 3, wherein said second transformation means comprises:

memory means for receiving and storing said selectively input keyed digital video signal in accordance with a plurality of memory write addresses, and for outputting said stored digital video signal in accordance with a plurality of memory read addresses; and addressor means for selectively providing said pluralities of memory write and read addresses.

22. A digital video effects generator as recited in claim 21, wherein said memory means comprises a dual port random access memory.

23. A digital video effects generator as recited in claim 21, wherein said addressor means comprises an address generator coupled to said memory means for providing said pluralities of memory write and read addresses, and wherein said memory write addresses are incremented by a write value, said memory read addresses are incremented by a read value, and said write and read values are selectively dissimilar to render said outputted digital video signal spatially transformed relative to said stored digital video signal.

24. A digital video effects generator as recited in claim 3, wherein said output keyer means comprises a multiplier and a plurality of adders coupled to output key said received, selectively spatially transformed digital video signal onto said received second background digital video signal substantially in accordance with the formula:

$$VO = VT2(KO) + VB2(1-KO)$$

where:
VO = said output keyed signal
KO = said received output key signal
$0 \leq KO \leq 1$
VT2 = said received, selectively spatially transformed digital video signal
VB2 = said received second background digital video signal.

25. A digital video effects generator as recited in claim 4, wherein said receiver means comprises a signal splitter.

26. A digital video effects generator as recited in claim 4, wherein said transformation means comprises a non-spatial transform processor.

27. A digital video effects generator as recited in claim 4, wherein said keyer means comprises a multiplier and a plurality of adders coupled to key said received, selectively transformed first digital video signal onto said received second digital video signal substantially in accordance with the formula:

$$VK = V1(K) + V2(1-K)$$

where:
VK = said keyed signal
K = said received key signal
$0 \leq K \leq 1$
V1 = said received, selectively transformed first digital video signal.

28. A digital video effects method for increasing the effective sampling frequency of and selectively spatially transforming a digital video signal, said digital video effects method comprising the steps of:

receiving and up-sampling a digital video signal;
selectively spatially transforming said up sampled digital video signal; and
interpolating said selectively spatially transformed, up-sampled digital video signal.

29. A digital video effects method as recited in claim 28, wherein said step of receiving and up-sampling a digital video signal comprises filtering said received digital video signal with at least one multi-tap digital finite impulse response filter.

30. A digital video effects method as recited in claim 28, wherein said step of selectively spatially transforming said up-sampled digital video signal comprises:

generating a plurality of memory write addresses and a plurality of read addresses;
storing said up-sampled digital video signal in accordance with said plurality of memory write addresses; and
outputting said stored digital video signal in accordance with said plurality of memory read addresses.

31. A digital video effects method as recited in claim 30, wherein said step of generating said plurality of memory write addresses and said plurality of read addresses comprises incrementing said memory write addresses by a write value and incrementing said memory read addresses by a read value, and wherein said write and read values are selectively dissimilar to render said outputted digital video signal spatially transformed relative to said stored digital video signal.

32. A digital video effects method as recited in claim 28, wherein said step of interpolating said selectively spatially transformed, up-sampled digital video signal comprises receiving interpolation coefficient data and linearly interpolating said selectively spatially transformed, up-sampled digital video signal in accordance therewith.

33. A digital video effects method for selectively spatially transforming digital video signal data in accordance with motion data representing relative video data motion between temporally adjacent video data, said digital video effects method comprising the steps of:
  receiving a digital video data signal including a plurality of video signal data sets;
  detecting relative video data motion between temporally adjacent video signal data sets among said plurality of video signal data sets, and providing a spatially-mapped video motion interpolation coefficient data signal corresponding to said detected relative video data motion;
  selectively spatially transforming said received digital video data signal, wherein the spatial transformation of said selectively spatially transformed digital video data signal corresponds to the spatial mapping of said spatially-mapped video motion interpolation coefficient data signal;
  providing a video interpolation coefficient data signal; and
  interpolating said selectively spatially transformed digital video data signal in accordance with said video interpolation coefficient data signal and said spatially-mapped video motion interpolation coefficient data signal.

34. A digital video effects method as recited in claim 33, wherein said step of detecting relative video data motion between temporally adjacent video signal data sets among said plurality of video signal data sets and providing a spatially-mapped video motion interpolation coefficient data signal corresponding to said detected relative video data motion comprises:
  storing said received digital video data signal and outputting said stored digital video data signal after a selected time period;
  differentially adding said received digital video data signal and said stored and outputted digital video data signal to provide a differential sum data signal representing said detected relative video data motion; and
  selectively spatially transforming said differential sum data signal; and
  converting said selectively spatially transformed differential sum data signal to said spatially-mapped video motion interpolation coefficient data signal.

35. A digital video effects method as recited in claim 34, wherein said step of selectively spatially transforming said differential sum data signal comprises:
  generating a plurality of motion memory write address signals and a plurality of motion memory read address signals;
  storing said differential sum data signal in accordance with said plurality of motion memory write address signals; and
  outputting said stored differential sum data signal in accordance with said plurality of motion memory read address signals.

36. A digital video effects method as recited in claim 34, wherein said step of converting said selectively spatially transformed differential sum data signal to said spatially-mapped video motion interpolation coefficient data signal comprises inputting said selectively spatially transformed differential sum data signal as a read address signal to a look-up table and outputting therefrom said spatially-mapped video motion interpolation coefficient data signal.

37. A digital video effects method as recited in claim 35, wherein said step of generating said pluralities of motion memory write and read address signals comprises incrementing said motion memory write address signals by a motion write value and incrementing said motion memory read address signals by a motion read value, and wherein said motion write and read values are selectively dissimilar to render said outputted differential sum data signal spatially transformed relative to said stored differential sum data signal.

38. A digital video effects method as recited in claim 33, wherein said step of selectively spatially transforming said received digital video signal data signal comprises:
  generating a plurality of video memory write address signals and a plurality of video memory read address signals;
  storing said received digital video data signal in accordance with said plurality of video memory write address signals; and
  outputting said stored digital video data signal in accordance with said plurality of video memory read address signals.

39. A digital video effects method as recited in claim 38, wherein said step of generating said plurality of video memory write address signals and said plurality of video read address signals comprises incrementing said video memory write address signals by a video write value and incrementing said video memory read address signals by a video read value, and wherein said video write and read values are selectively dissimilar to render said outputted digital video data signal spatially transformed relative to said stored digital video data signal.

40. A digital video effects method for selectively keying, spatially transforming and re-keying a digital video signal, said digital video effects method comprising the steps of:
  receiving and selectively transforming a digital video signal;
  receiving a first background digital video signal and an input key signal;
  selectively input keying said selectively transformed digital video signal onto said first background digital video signal in accordance with said input key signal;
  selectively spatially transforming said selectively input keyed digital video signal;
  receiving a second background digital video signal and an output key signal; and
  selectively output keying said selectively spatially transformed digital video signal onto said second background digital video signal in accordance with said output key signal.

41. A digital video effects method as recited in claim 40, wherein said step of receiving and selectively transforming a digital video signal comprises non-spatially transforming said digital video signal.

42. A digital video effects method as recited in claim 40, wherein said step of selectively input keying said selectively transformed digital video signal comprises keying said selectively transformed digital video signal onto said first background digital video signal substantially in accordance with the formula:

$$VI = VT1(KI) + VB1(1-KI)$$

where:
VI = said input keyed signal
KI = said input key signal
$0 \leq KI \leq 1$
VT1 = said selectively transformed digital video signal
VB1 = said first background digital video signal.

43. A digital video effects method as recited in claim 40, wherein said step of selectively spatially transforming said selectively input keyed digital video signal comprises:
generating a plurality of memory write addresses and a plurality of memory read addresses;
storing said selectively input keyed digital video signal in accordance with said plurality of memory write addresses; and
outputting said stored digital video signal in accordance with said plurality of memory read addresses.

44. A digital video effects method as recited in claim 43, wherein said step of generating said pluralities of memory write and read addresses comprises incrementing said memory write addresses by a write value and incrementing said memory read addresses by a read value, and wherein said write and read values are selectively dissimilar to render said outputted digital video signal spatially transformed relative to said stored digital video signal.

45. A digital video effects method as recited in claim 40, wherein said step of selectively output keying said selectively spatially transformed digital video signal comprises keying said selectively spatially transformed digital video signal onto said second background digital video signal substantially in accordance with the formula:

$$VO = VT2(KO) + VB2(1-KO)$$

where:
VO = said output keyed signal
KO = said output key signal
$0 \leq KO \leq 1$
VT2 = said selectively spatially transformed digital video signal
VB2 = said second background digital video signal.

46. A digital video effects method for selectively transforming a portion of a digital video signal, said digital video effects method comprising the steps of:
receiving an input digital video signal representing a video image and providing therefrom first and second digital video signals, wherein said first and second digital video signals are substantially alike;
selectively transforming said first digital video signal;
receiving a key signal; and
selectively keying said selectively transformed first digital video signal onto said second digital video signal in accordance with said key signal.

47. A digital video effects method as recited in claim 46, wherein said step of receiving an input digital video signal representing a video image and providing therefrom first and second digital video signals comprises splitting said input digital video signal to produce said first and second digital video signals.

48. A digital video effects method as recited in claim 46, wherein said step of selectively transforming said first digital video signal comprises selectively non-spatially transforming said first digital video signal.

49. A digital video effects method as recited in claim 46, wherein said step of selectively keying said selectively transformed first digital video signal onto said second digital video signal in accordance with said key signal comprises keying said selectively transformed first digital video signal onto said received second digital video signal substantially in accordance with the formula:

$$VK = V1(K) + V2(1-K)$$

where:
VK = said keyed signal
K = said key signal
$0 \leq K \leq 1$
V1 = said selectively transformed first digital video signal
V2 = said second digital video signal.

50. A digital video effects generator for interpolating selectively spatially transformed digital video signal data in accordance with video motion data representing relative video data motion between temporally adjacent video signal data sets, said digital video effects generator comprising:
detector means for receiving digital video signal data including a plurality of video signal data sets, for detecting relative video data motion between temporally adjacent video signal data sets among said plurality of video signal data sets, and for providing spatially-mapped video motion interpolation coefficient data corresponding to said detected relative video data motion;
video transformation means for further receiving said digital video signal data, for selectively spatially transforming said received digital video signal data, and for providing video interpolation coefficient data; and
interpolator means for receiving said selectively spatially transformed digital video signal data, said video interpolation coefficient data and said spatially-mapped video motion interpolation coefficient data, and for interpolating said received, selectively spatially transformed digital video signal in accordance with said received video interpolation coefficient data and said received spatially-mapped video motion interpolation coefficient data;
wherein said received, selectively spatially transformed digital video signal data includes pixel data comprising a plurality of pixels on a plurality of scan lines, and further wherein said interpolator means comprises a linear interpolator for linearly interpolating said received, selectively spatially transformed digital video signal data substantially in accordance with the formula:

$$V_1 = P(X,Y)*K_1 + P(X,Y+1)*K_2 + P(X,Y+2)*K_3$$

where:

$V_I$ = said interpolated, selectively spatially transformed digital video signal data
P(a,b) = pixel data at pixel "a" on scan line "b"
$K_1 = \alpha_{VA}*\alpha_M + \alpha_{VB}*(1-\alpha_M)$
$K_2 = (1-\alpha_{VB})*(1-\alpha_M)$
$K_3 = (1-\alpha_{VA})*\alpha_M$
$\alpha_{VA}$ = video interpolation coefficient data for a first video signal data set
$\alpha_{VB}$ = video interpolation coefficient data for a second video signal data set which is temporally adjacent to said first video signal data set
$\alpha_M$ = said spatially-mapped video motion interpolation coefficient data.

51. A digital video effects generator for interpolating digital video signal data in accordance with video motion data representing relative video data motion between temporally adjacent video signal data sets, said digital video effects generator comprising:

motion coefficient source means for providing video motion interpolation coefficient data corresponding to relative video data motion between temporally adjacent video signal data sets among a plurality of video signal data sets;

video coefficient source means for providing video interpolation coefficient data; and interpolator means for receiving digital video signal data including said plurality of video signal data sets, for receiving said video interpolation coefficient data and said video motion interpolation coefficient data, and for interpolating said received digital video signal data in accordance with said received video interpolation coefficient data and said received video motion interpolation coefficient data;

wherein said received digital video signal data includes pixel data comprising a plurality of pixels on a plurality of scan lines, and further wherein said interpolator means comprises a linear interpolator for linearly interpolating said received digital video signal data substantially in accordance with the formula:

$$V_I = P(X,Y)*K_1 + P(X,Y+1)*K_2 + P(X,Y+2)(K_3$$

where:

$V_I$ = said interpolated digital video signal data
P(a,b) = pixel data at pixel "a" on scan line "b"
$K_1 = \alpha_{VA}*\alpha_M + \alpha_{VB}*(1-\alpha_M)$
$K_2 = (1-\alpha_{VB})*(1-\alpha_M)$
$K_3 = (1-\alpha_{VA})*\alpha_M$
$\alpha_{VA}$ = video interpolation coefficient data for a first video signal data set
$\alpha_{VB}$ = video interpolation coefficient data for a second video signal data set which is temporally adjacent to said first video signal data set
$\alpha_M$ = said video motion interpolation coefficient data.

52. A digital video effects method for selectively spatially transforming digital video signal data in accordance with motion data representing relative video data motion between temporally adjacent video data, said digital video effects method comprising the steps of:

receiving a digital video data signal including a plurality of video signal data sets;

detecting relative video data motion between temporally adjacent video signal data sets among said plurality of video signal data sets, and providing a spatially-mapped video motion interpolation coefficient data signal corresponding to said detected relative video data motion;

selectively spatially transforming said received digital video data signal;

providing a video interpolation coefficient data signal; and interpolating said selectively spatially transformed digital video data signal in accordance with said video interpolation coefficient data signal and said spatially-mapped video motion interpolation coefficient data signal;

wherein said selectively spatially transformed digital video data signal includes pixel data comprising a plurality of pixels on a plurality of scan lines, and further wherein said step of interpolating said selectively spatially transformed digital video data signal in accordance with said video interpolation coefficient data signal and said spatially-mapped video motion interpolation coefficient data signal comprises linearly interpolating said selectively spatially transformed digital video data signal substantially in accordance with the formula:

$$V_I = P(X,Y)*K_1 + P(X,Y+1)*K_2 + P(X,Y+2)*K_3$$

where:

$V_I$ = said interpolated, selectively spatially transformed digital video data signal
P(a,b) = pixel data at pixel "a" on scan line "b"
$K_1 = \alpha_{VA}*\alpha_M + \alpha_{VB}*(1-\alpha_M)$
$K_2 = (1-\alpha_{VB})*(1-\alpha_M)$
$K_3 = (1-\alpha_{VA})*\alpha_M$
$\alpha_{VA}$ = video interpolation coefficient data for a first video signal data set
$\alpha_{VB}$ = video interpolation coefficient data for a second video signal data set which is temporally adjacent to said first video signal data set
$\alpha_M$ = said spatially-mapped video motion interpolation coefficient data signal.

53. A digital video effects method for interpolating a digital video data signal in accordance with video motion data representing relative video data motion between temporally adjacent video signal data sets, said digital video effects method comprising the steps of:

receiving a digital video data signal including a plurality of video signal data sets;

receiving a video motion interpolation coefficient data signal corresponding to relative video data motion between temporally adjacent video signal data sets among said plurality of video signal data sets;

receiving a video interpolation coefficient data signal; and interpolating said digital video data signal in accordance with said video interpolation coefficient data signal and said video motion interpolation coefficient data signal;

wherein said digital video data signal includes pixel data comprising a plurality of pixels on a plurality of scan lines, and further wherein said step of interpolating said digital video data signal in accordance with said video interpolation coefficient data signal and said video motion interpolation coefficient data signal comprises linearly interpolating said digital video data signal substantially in accordance with the formula:

$$V_I = P(X,Y)*K_1 + P(X,Y+1)*K_2 + P(X,Y+2)*K_3$$

where:
$V_I$ = said interpolated digital video data signal
$P(a,b)$ = pixel data at pixel "a" on scan line "b"
$K_1 = \alpha_{VA}*\alpha_M + \alpha_{VB}*(1-\alpha_M)$
$K_2 = (1-\alpha_{VB})*(1-\alpha_M)$
$K_3 = (1-\alpha_{VA})*\alpha_M$
$\alpha_{VA}$ = video interpolation coefficient data signal for a first video signal data set
$\alpha_{VB}$ = video interpolation coefficient data signal for a second video signal data set which is temporally adjacent to said first video signal data set
$\alpha_M$ = said video motion interpolation coefficient data signal.

54. A digital video effects generator for interpolating digital video signal data in accordance with video motion data representing relative video data motion between temporally adjacent video signal data sets, said digital video effects generator comprising:

motion coefficient source means for providing video motion interpolation coefficient data corresponding to relative video data motion between temporally adjacent video signal data sets among a plurality of video signal data sets, wherein said motion coefficient source means includes a look-up table for receiving said motion coefficient access data as input addresses and providing said video motion interpolation coefficient data as output data;

video coefficient source means for providing video interpolation coefficient data;

interpolator means for receiving digital video signal data including said plurality of video signal data sets, for receiving said video interpolation coefficient data and said video motion interpolation coefficient data, and for adaptively interpolating said received digital video signal data in accordance with said received video interpolation coefficient data and said received video motion interpolation coefficient data, wherein said adaptive interpolation uses an amount of video signal data from a temporally adjacent video signal data set which is inversely proportional to said relative video data motion; and detector means for receiving said digital video signal data including a plurality of video signal data sets, for detecting relative video data motion between temporally adjacent video signal data sets among said plurality of video signal data sets, and for providing motion coefficient access data, wherein said motion coefficient source means receives said motion coefficient access data and provides said video motion interpolation coefficient data in accordance therewith.

* * * * *

UNITED STATES PATENT AND TRADEMARK OFFICE
CERTIFICATE OF CORRECTION

PATENT NO. : 5,369,443
DATED : NOVEMBER 29, 1994
INVENTOR(S) : David J. Woodham

It is certified that error appears in the above-indentified patent and that said Letters Patent is hereby corrected as shown below:

In Col. 11, line 14, before "for" insert --, and--.

In Col. 11, line 40, delete "and" and replace with --said--.

In Col. 12, line 29, delete "whereins aid" and replace with --wherein said--.

In Col. 14, line 41, delete ".".

In Col. 14, line 42, insert --V2 = said received second digital video signal.--.

In Col. 14, line 47, delete "up sampled" and replace with --up-sampled--.

In Col. 19, line 46, delete "$V_I=P(X,Y)*K_1+P(X,Y+1)*K_2+P(X,Y+2)(K_3$" and replace with --$V_I=P(X,Y)*K_1+P(X,Y+1)*K_2+P(X,Y+2)*K_3$--.

Signed and Sealed this

Seventh Day of February, 1995

Attest:

BRUCE LEHMAN

Attesting Officer   Commissioner of Patents and Trademarks